Figure 1:
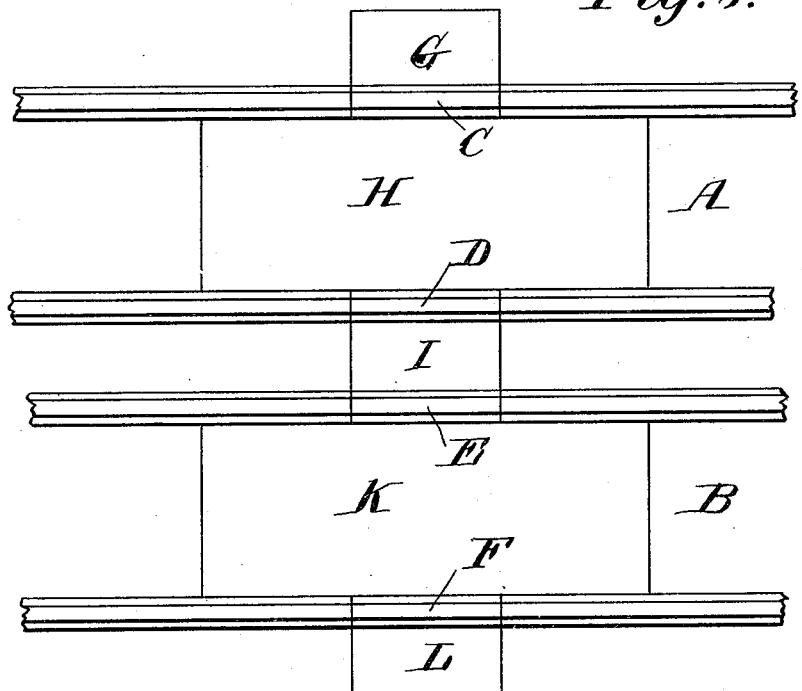

(No Model.)  2 Sheets—Sheet 1.

H. SYM.
APPARATUS FOR REMOVING AND REPLACING THE WHEELS AND AXLES OF RAILWAY CARS.

No. 352,587.  Patented Nov. 16, 1886.

Witnesses.
W. Decaire
J. H. McGregor

Inventor
Hugh Sym
By his Attorney
Charles G. C. Simpson (No Model.) 2 Sheets—Sheet 2.
H. SYM.
APPARATUS FOR REMOVING AND REPLACING THE WHEELS AND AXLES OF RAILWAY CARS.
No. 352,587. Patented Nov. 16, 1886.
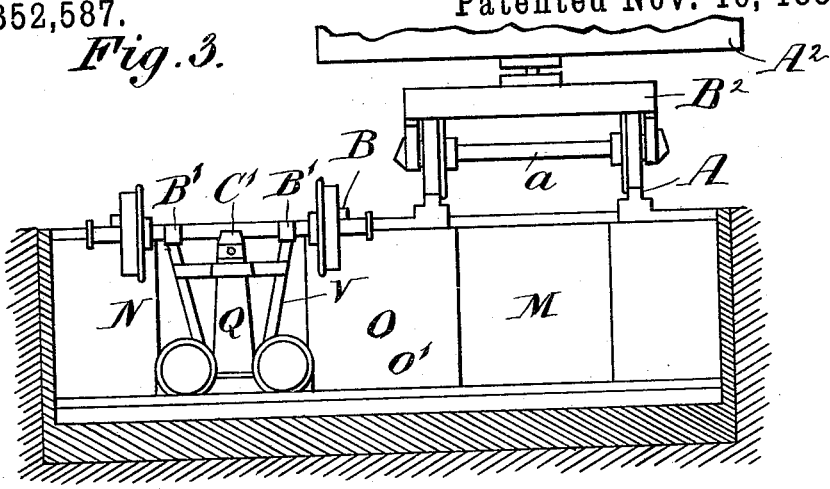
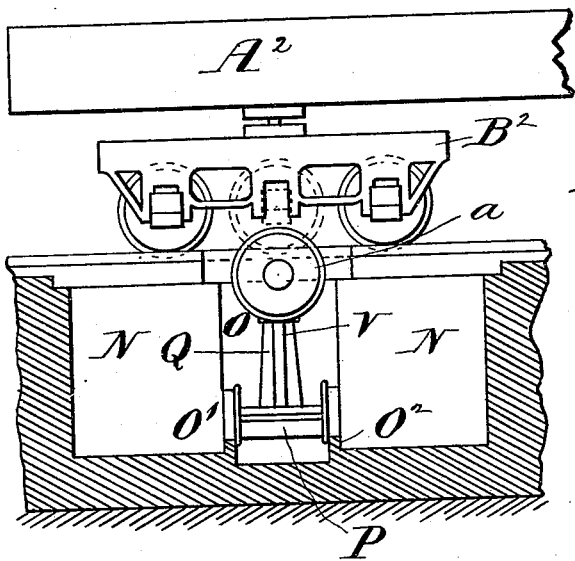
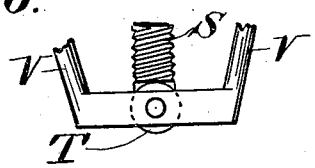
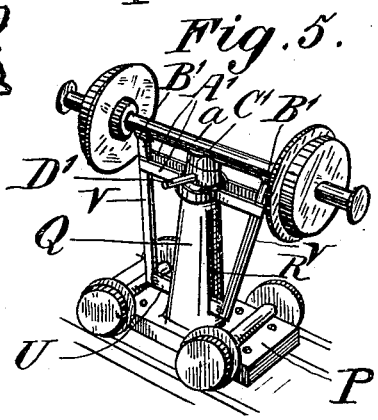
Witnesses.
W. Decane
J. K. McGregor
Inventor
Hugh Sym
By his Attorney
Charles G. L. Simpson

United States Patent Office.

HUGH SYM, OF MONTREAL, QUEBEC, CANADA.

APPARATUS FOR REMOVING AND REPLACING THE WHEELS AND AXLES OF RAILWAY-CARS.

SPECIFICATION forming part of Letters Patent No. 352,587, dated November 16, 1886.

Application filed August 17, 1886. Serial No. 211,176. (No model.)

*To all whom it may concern:*

Be it known that I, HUGH SYM, of the city of Montreal, in the District of Montreal, Province of Quebec, Canada, have invented new and useful Improvements in Apparatus for Removing and Replacing the Wheels and Axles of Railway-Cars; and I do hereby declare that the following is a full, clear, and exact description of the same.

This invention has reference to an improved construction and arrangement of apparatus by which, when the wheels or axle of a car become defective, they may be readily removed from their position in the truck of the car and a pair of wheels and axle placed therein without the necessity of unloading the car or displacing the truck from the car.

Particular advantage may be derived from this invention in such cases as where wheels and axles are all made from one pattern, and where the cars run through on through routes, in which case a car may within fifteen or twenty minutes have a defective pair of wheels and axle removed and a new or proper pair of wheels and axle placed in their stead.

The particular features which form the patentable invention in this application will be hereinafter fully set forth and claimed.

In the drawings hereunto annexed similar letters of reference indicate like parts.

Figure 2:
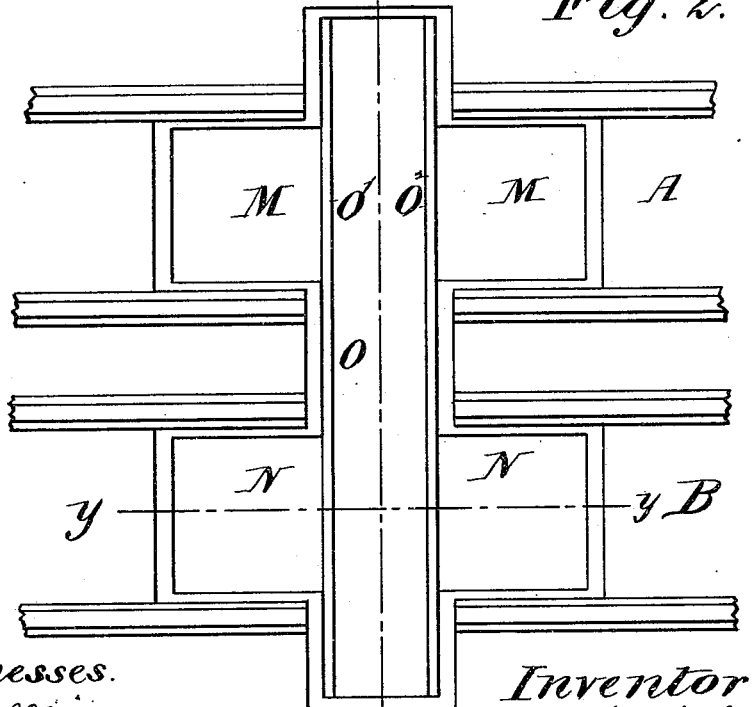

Figure 1 is a plan of the invention as arranged ready to receive a car from which a pair of defective wheels and axle are to be removed. Fig. 2 is a plan of the invention as arranged while removing a pair of wheels and axle and replacing them with a pair in proper order or repair. Fig. 3 is a transverse vertical section on line $x$, Fig. 2, showing in elevation in connection therewith a portion of the body of a car and truck, also the jack by which the wheels and axle are removed. Fig. 4 is a longitudinal vertical section on line $y\ y$, Fig. 2, showing in connection therewith portion of the body of a car and truck, also the jack, in elevation, and the manner of removing and replacing a pair of wheels and axle. Fig. 5 is an isometrical view of a jack for raising and lowering the wheels and axle of a car, &c. Fig. 6 is a detail of the jack.

Letters A and B are two ordinary rail-tracks situated at a suitable distance apart for the purposes hereinafter mentioned. In the tracks A and B removable and replaceable portions C D E F are provided, also covers G, H, I, K, and L, as shown in Fig. 1. These cover up the longitudinal pits M and N and the transverse pit O. The sides of these pits are preferably built of timber or mason-work, or both, so that the rails and the removable portion of them, C, D, E, and F, will have a sufficiently even and substantial bed to rest upon.

In the transverse pit O rails $O'\ O^2$ are laid in an ordinary manner for the small truck P to run upon. On this truck is mounted a screw-jack of ordinary construction, except that it is provided in its standard Q with a slot-opening, R, on each side. The end of the screw S of the jack is provided with an eye, T, and to this eye is pivoted a cross-bar, U, extending by upturned arms V, which are attached together by cross-bars A'. The arms are terminated in bearings B', suitable for the axle to rest upon. The head of the jack also terminates in a bearing, C', suitable for the axle to rest upon.

D' is the lever by which the jack is operated.

The operation of the invention is as follows: When it is desired to remove a pair of wheels and axle from a truck of a car and replace them by another, the car $A^2$ and truck $B^2$ are brought upon either of the tracks A or B—we will suppose it is brought on the track A—until the pair of wheels and axle to be removed are immediately over and centrally situated upon the removable portions C D of the rails. The covers G, H, I, K, and L may be either previously or now removed. The truck P, with its jack, is run under the axle to be removed, and the jack is screwed up until the wheels of the axle to be removed are slightly raised above the loose portions C D of the rails. These are then removed, and the trappings which secure the axle-boxes in the housings of the truck are removed, so that there may not be any obstruction in lowering the wheels and axle $a$ from the position shown in dotted lines in Fig. 4 to that shown in solid lines in that figure. The above having been done, the truck P and jack bearing the wheels and axle are run over to the next track B, as shown in Fig. 3. The jack is then raised to bring the wheels to the level of the track B, the loose pieces E and F are put in place and wheels and axle lowered upon them, and the jack having been lowered a sufficient amount to clear the imperfect wheels and axle they are rolled away and a new or proper pair are brought over the jack, whereupon the jack is raised to carry them by the bearings B' and C', the loose portions of the rails E and F are again removed, and the jack is lowered to the position before referred to. The truck P, jack, and wheels, with axle, are then run over to the track A, and by raising the jack the wheel and axle are brought to their place in the truck of the car from which the wheels and axle have been removed, as hereinbefore described.

It will be observed that, as illustrated in the drawings, a six-wheeled truck is delineated, and that it is the center pair of wheels that is being removed. When a truck of four wheels is operated upon, the frame of the truck would preferably be supported by blocks or jacks during the operation of removing and replacing the wheels and axle, hereinbefore described.

What I claim is as follows:

1. The combination of the tracks A B, having removable portions C D E F, pits M N, and pit O, having rails O' O², and truck P, having jack for carrying the axle and wheels, the whole constructed and arranged substantially as described.

2. The combination of the truck P, having jack provided with arms V, pivoted to the screw thereof, said arms having bearings B', and jack-screw having bearing C', the whole constructed and arranged substantially as described.

HUGH SYM.

Witnesses:
CHARLES G. C. SIMPSON,
W. DECANE.